United States Patent [19]
Gaylord

[11] 3,929,550
[45] Dec. 30, 1975

[54] PROCESS FOR PROMOTING POLYOLEFIN ADHESION

[75] Inventor: Norman G. Gaylord, New Providence, N.J.

[73] Assignee: Dart Industries Inc., Los Angeles, Calif.

[22] Filed: Aug. 27, 1973

[21] Appl. No.: 392,134

[52] U.S. Cl. ............... 156/306; 156/309; 156/334; 260/94.9 GA; 260/888; 260/610 R; 260/DIG. 28; 427/385
[51] Int. Cl.² ................................... C09J 5/00
[58] Field of Search ........... 156/306, 326, 309, 327, 156/328, 334, 242, 284, 283, 307, 308, 285, 325; 117/65.2, 161 UZ, 165; 161/216, 265, 247; 260/94.9 GR, 94.9 G, 610 R, 888, 94.9 R, 94.9 GA, DIG. 28

[56] References Cited
UNITED STATES PATENTS

| | | | |
|---|---|---|---|
| 2,403,709 | 7/1946 | Dickey et al. | 260/DIG. 28 |
| 2,403,771 | 7/1946 | Vaughan et al. | 260/DIG. 28 |
| 2,455,569 | 12/1948 | Dickey | 206/DIG. 28 |
| 2,605,291 | 7/1952 | Barusch et al. | 260/610 R |
| 2,795,618 | 6/1957 | Emerson et al. | 260/DIG. 28 |
| 2,938,012 | 5/1960 | Filar | 260/610 R |
| 3,293,233 | 12/1966 | Erchak, Jr. et al. | 260/94.9 R |
| 3,359,154 | 12/1967 | Clark | 161/216 |
| 3,481,812 | 12/1969 | Holub et al. | 156/306 |
| 3,523,862 | 8/1970 | Lybeck | 161/216 |
| 3,617,419 | 11/1971 | Fischer et al. | 156/334 |
| 3,622,440 | 11/1971 | Snedeker et al. | 156/334 |
| 3,640,985 | 2/1972 | Stevens | 260/610 R |
| 3,663,334 | 5/1972 | Mueller-Tamm et al. | 156/334 |

FOREIGN PATENTS OR APPLICATIONS

| | | | |
|---|---|---|---|
| 883,902 | 10/1971 | Canada | 260/94.9 GC |

OTHER PUBLICATIONS

Considine (editor) "Chemical and Process Technology Encyclopedia", New York, McGraw–Hill.
Barusch et al., "Preparation of β-Hydroxydiethyl Peroxides", J. Am. Chem. Soc. 75, 1987 (1953).

*Primary Examiner*—Douglas J. Drummond
*Assistant Examiner*—J. J. Gallagher
*Attorney, Agent, or Firm*—Arthur S. Collins; Bryant W. Brennan; Fred S. Valles

[57] ABSTRACT

A process for promoting the adhesion of polyolefins to a substrate comprising admixing an olefin polymer with t-butyl beta-hydroxyethyl peroxide, applying the resulting polyolefin to a substrate surface and applying heat and pressure thereto to affect adhesion of the polyolefin to said surface.

6 Claims, No Drawings

PROCESS FOR PROMOTING POLYOLEFIN ADHESION

This invention relates to a process for promoting the adhesion of polyolefins to a wide variety of substrates. More particularly, the invention relates to a method for promoting the adhesion of polyolefins by incorporation therein of t-butyl beta-hydroxyethyl peroxide.

Olefin polymers are useful as laminating materials because of their general inertness, i.e., they are generally unaffected by moisture and chemically active environments. This general inertness, however, has also limited the applicability of olefin polymers as laminating materials because of the inability to adhere the olefin polymers to a wide variety of substrate materials without costly pretreatment of the olefin polymer surface, as by etching with chromic acid or subjecting the film to corona discharge or flame treatment.

It has heretofore been considered necessary to treat olefin polymers to introduce polar functionality into the surface layers thereof in order to secure adhesion to substrate surfaces. This has heretofore been accomplished by treatment of the olefin polymer surface as by oxidizing, etching or the like. It has also been accomplished by effecting copolymerization with comonomers containing functional groups therein. These chemical or physical modifications of the polyolefin surface are costly and not altogether satisfactory. Other attempts at modification of the polyolefin surface have been affected by treatment with peroxides. Although peroxide cross-linking does impart a degree of adhesion to the polyolefin; nevertheless, undesirable side effects such as the leaving of residues which may adversely affect stability, electrical and permeability properties have also been associated therewith.

Accordingly, it is an object of the present invention to provide a process for promoting the adhesion of polyolefins which overcomes the deficiencies associated with the prior art.

It is another object of the present invention to provide a process for promoting the adhesion of polyolefins with t-butyl beta-hydroxyethyl peroxide.

It is still another object of the present invention to provide a process for preparing a polyolefin adhesive which can be employed to tenaciously adhere substrate surfaces together.

These as well as other objects are accomplished by the present invention which provides a process for promoting the adhesion of polyolefins to a substrate which comprises admixing an olefin polymer with t-butyl beta-hydroxyethyl peroxide, applying the resulting polyolefin to a substrate surface and applying heat and pressure thereto to affect adhesion of the olefin polymer to said surface.

The term "olefin polymer" as used herein is intended to denote normally solid homopolymers of alpha mono-olefinically unsaturated hydrocarbons as well as normally solid copolymers thereof with one or more other organic compounds copolymerizable therewith.

For example, olefin polymers suitable for use in the present invention include polymers of ethylene, propylene, butene, styrene, and copolymers thereof including copolymers with polar monomers and the like. Preferred olefin polymers use in this invention are composed of alpha mono-olefinically unsaturated hydrocarbons containing from 2 to 4 carbon atoms, i.e., ethylene, propylene, and butene. Most preferred of the olefin polymers for use in the present invention in polyethylene. These olefin polymers can be employed in accordance with the present invention without prior physical treatment such as by oxidation or etching of the surface thereof and without copolymerization thereof to include polar functional groups within the polymer chain.

t-Butyl beta-hydroxyethyl peroxide is applied to the olefin polymer either by admixture therewith or by application to the surface of films or sheets thereof to impart adhesion of the olefin polymer to a wide variety of substrates in accordance with the present invention. The peroxide can be admixed with or applied to the olefin polymer in effective adhesion promoting amounts ranging from about 0.5% to about 5% by weight based on the weight of polymer. The peroxide is uniformly dispersed either throughout the olefin polymer mass or across the surface of films or sheets thereof employing conventional mechanical mixing apparatus for example as by roll milling, Banbury mixing, extrusion and the like or by conventional surface coating techniques such as spraying, knife coating, dip coating and the like. Most conveniently, the peroxide and polymer can both be charged to the hopper of an extruder, mixed in the barrel thereof and extrusion laminated or coated onto the desired substrate surface. Alternatively, the peroxide can be applied to the surface of olefin polymer films or sheets by spraying said peroxide onto the surface in the form of a solution or dispersion.

If desired, the olefin polymer can additionally be admixed with other additives such as fillers, like carbon black, clays, glass fibers, talc as well as pigments, antioxidants, plasticizers and the like.

The specific peroxide of the present invention, t-butyl beta-hydroxyethyl peroxide, has been found to be unique as compared to other peroxides with respect to imparting a high degree of adhesion to otherwise untreated olefin polymers. The peroxide has the following structural formula:

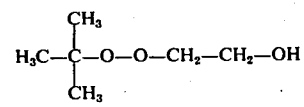

t-Butyl beta-hydroxyethyl peroxide exhibits a half life in xylene at a concentration of 0.2 mole at various temperatures as set forth in the Table below:

Half Life
t-butyl beta-hydroxyethyl peroxide

| Temp(°C) | Hours | 10 Hour Half Life Temp.°C. |
| --- | --- | --- |
| 120 | 11.0 | 122 |
| 130 | 4.2 | |
| 140 | 2.0 | | t-Butyl beta-hydroxyethyl peroxide is very soluble in alcohols and ketones at about room temperature and is about 15–50% soluble in water at room temperature. Thus, it is quite convenient to prepare solutions of the peroxide to effect spraying thereof onto the surface of olefin polymer films or sheets.

Olefin polymers treated in accordance with the present invention exhibit tenacious adhesion to a wide variety of substrates such as metallic surfaces for example, aluminum foil, glass, cellulosic films, siliceous surfaces such as ceramics as well as to fillers such as clays, glass fibers, talc, and the like.

Once the olefin polymers have been either admixed with the peroxide or the peroxide has been applied to the surface thereof, the treated surface of the resulting polymer can be placed in contact with the substrate to be coated and the resulting sandwich can then be heated under pressure at temperatures ranging from about 110°C. to about 225°C. or higher. Preferably, heating or curing can be effected at temperatures from about 122° to about 190°C. Pressures ranging from about 20,000 to about 40,000 psi have been found sufficient to effect satisfactory lamination. If desired, the olefin polymer treated in accordance with the present invention can be applied to the surface of one substrate and then another film, foil, sheet, plate or the like which can be of the same or different material can be overlayed thereupon to prepare a sandwich in which the olefin polymer acts as an adhesive to securely laminate the two opposed substrates. Upon thermoforming the olefin polymer admixed together with the peroxide and a filler, as, for example, by injection molding, compression molding, extursion molding, as well as extrusion, a formed article exhibiting improved adhesion and compatibility with the filler is obtained.

Although not wishing to be bound by any theory or mechanism, it is currently believed that the thermal docomposition of t-butyl beta-hydroxyethyl peroxide yields fragments containing hdyroxyl groups. When the peroxide is either admixed with the polyolefin or applied to the surface thereof and heated under pressure, the peroxide radicals chemically bond to the polymer while the hydroxyl groups provide adhesion promoting sites to the substrate. In this manner, tenacious adhesion of the olefin polymer with a wide variety of substrates is obtained.

The following example further defines, describes and compares methods of promoting adhesion in olefin polymers in accordance with the present invention and of utilizing said olefin polymers to effect lamination of various substrates. Unless otherwise state, all percentages and parts are by weight.

EXAMPLE a. Mixing

Low density polyethylene (100 g) was mixed with the following peroxides (2.0 g each) in a Brabender Plasticorder: (1) dicumyl peroxide (DICUP) (2) di-t-butyl peroxide (DTBP) and (3) t-butyl hydroxyethyl peroxide (TBHEP). The polyethylene was fluxed at 115°-120°C. for 10 minutes at which point the peroxide was added. The mixing was carried out for 5 min. at 115°-120°C. The sample was removed and then stored in a refrigerator.

b. Curing

The peroxide blended polyethylene was powdered and the powder was compression molded on aluminum plates (6 X 4 X ⅛ inches) between Teflon sheets applying a pressure of 28,000 psi. The molding cycle consisted of 3 minutes preheating, 5 minutes molding and 3 minutes cooling. The molding temperature for the various peroxides were adjusted to obtain a half life of 4 minutes and are listed below:

| Peroxide | Curing Temp. °C. |
|---|---|
| DICUP | 160 |
| DTBP | 176.7 |
| TBHEP | 190 | c. Peel Strength Measurement

The peel strength of the cured polyethylene to the substrate was measured as per ASTM D-903. A strip of at least one inch width was cut across the polyethylene and down to the substrate. The strip was then peeled at a constant rate and the force required measured in lbs/in. The peel strengths of the cured polyethylene films obtained with the various peroxides are listed below:

| Peroxide | Peel Strength lb/in |
|---|---|
| DICUP | 0.56 |
| DTBP | 0.72 |
| TBHEP | 2.62 |

The surprisingly enhanced adhesion obtained in accordance with the present invention is clearly demonstrated by this comparison.

Although specific materials and conditions were set forth in the above exemplary process for imparting adhesion to olefin polymers in accordance with this invention, these are merely intended as illustrations of the present invention. Various other olefin polymers, additives and processing conditions such as those listed above may be substituted in the example with similar results.

Other modifications of the present invention will occur to those skilled in the art upon a reading of the present disclosure. These are intended to be included within the scope of this invention.

What is claimed is:

1. A process for forming a tightly adherent layer of solid olefinic polymer on the surface of a solid substrate which comprises admixing as the entire resinous ingredient previously unmodified, normally solid synthetic resin derived entirely from alpha mono-olefinically unsaturated hydrocarbons containing from two to four carbon atoms with between about 0.5 and about 5% based upon the weight of said resin of t-butyl betahydroxyethyl peroxide, applying the resulting mixture directly to the surface of said solid substrate and then pressing said mixture against said substrate by the application of pressure of at least about 20,000 psi and elevated temperatures in the range from about 122° to about 190°C until the major portion of said t-butylbetahydroxyethyl peroxide has been decomposed.

2. A process as described in claim 1 wherein a second substrate is overlayed upon said mixture before applying said pressure and elevated temperature, thereby laminating the first substrate to the second.

3. A process as described in claim 1 wherein said previously unmodified, normally solid synthetic resin is derived essentially from ethylene.

4. A thermally activated pressure adhesive composition consisting essentially of a previously unmodified, normally solid synthetic resin derived entirely from alpha mono-olefinically unsaturated hydrocarbons containing from two to four carbon atoms as the only resinous component and between about 0.5 and about 5% based upon the weight of said resin of t-butylbetahydroxyethyl peroxide.

5. A thermally activated pressure adhesive composition as defined in claim 4 wherein a finely divided filler additive is also present.

6. A thermally activated pressure adhesive composition as in claim 4 wherein said previously unmodified, normally solid synthetic resin is a polyethylene.

* * * * *